Figure 1:
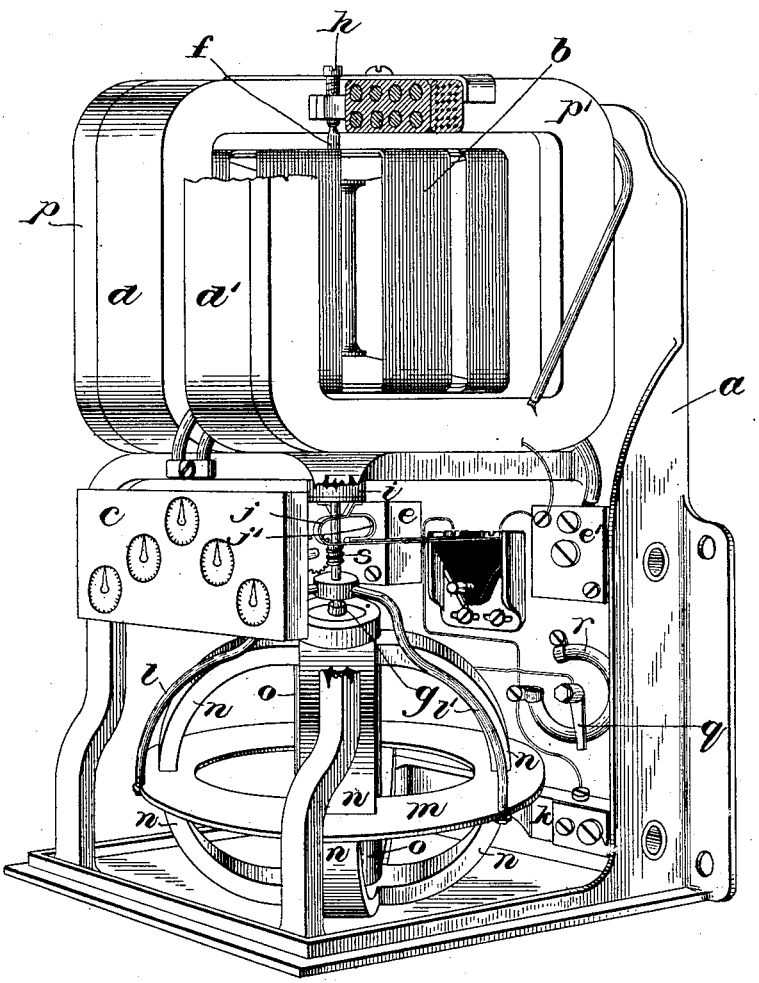

(No Model.)　　　　　　　　　　R. O. HOOD.　　　　　3 Sheets—Sheet 1.
ELECTRIC METER.

No. 561,711.　　　　　　　　　　　　　　Patented June 9, 1896.

Witnesses.　　　　　　　　　　　　　　　Inventor:
　　　　　　　　　　　　　　　　　　　　　R. O. Hood (No Model.) 3 Sheets—Sheet 2.
R. O. HOOD.
ELECTRIC METER.
No. 561,711. Patented June 9, 1896.
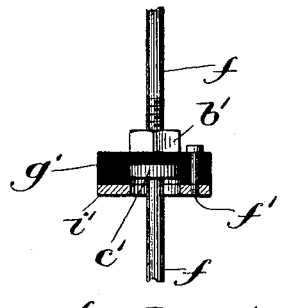
Fig: 3
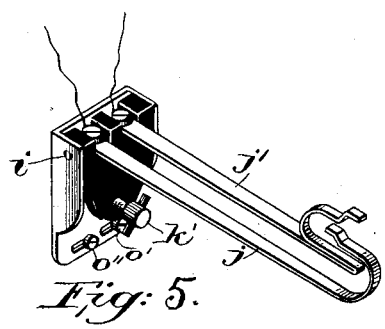
Fig: 5.
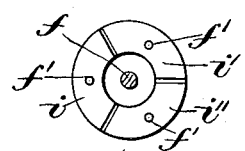
Fig: 4
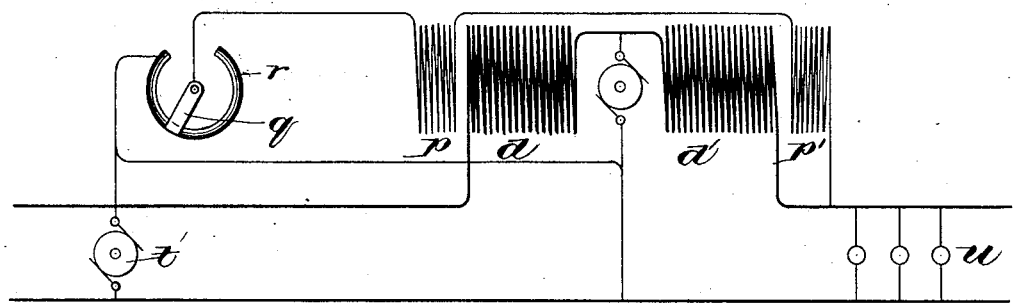
Fig: 2.
Witnesses: Inventor:
Arthur L. Randall Ralph O. Hood,
By Arthur O. Crossley
Atty.

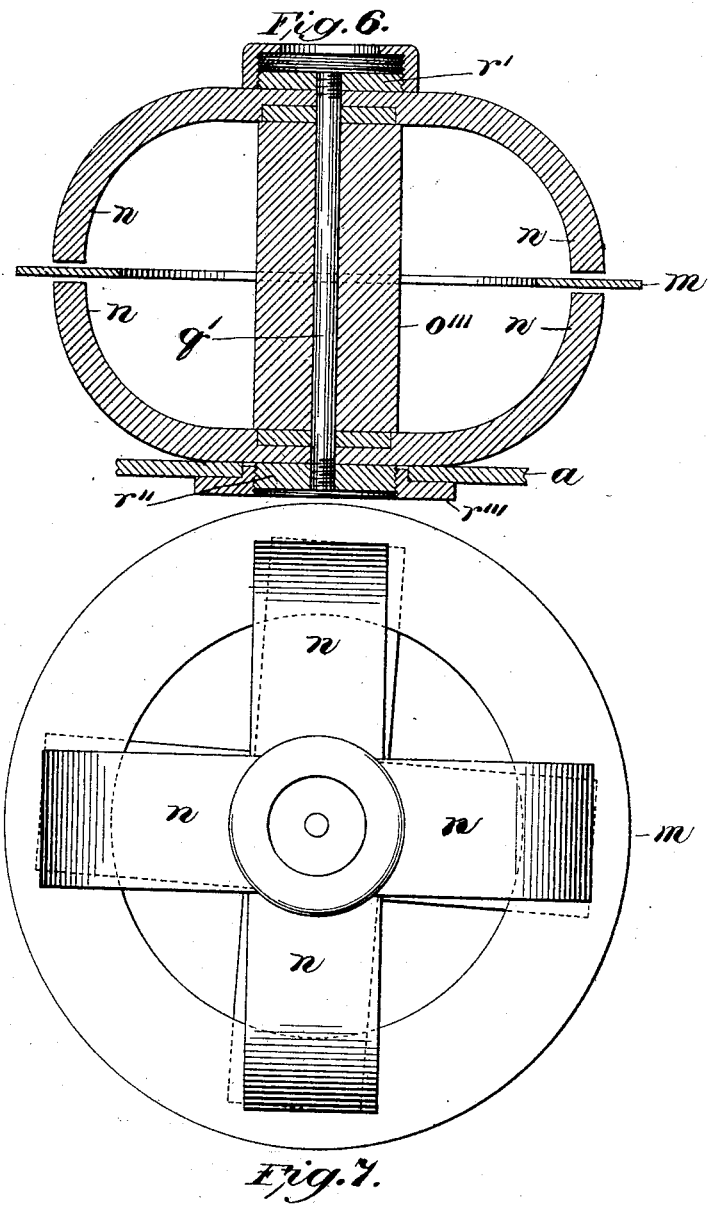

UNITED STATES PATENT OFFICE.

RALPH O. HOOD, OF DANVERS, MASSACHUSETTS.

ELECTRIC METER.

SPECIFICATION forming part of Letters Patent No. 561,711, dated June 9, 1896.

Application filed January 26, 1895. Serial No. 536,336. (No model.)

*To all whom it may concern:*

Be it known that I, RALPH O. HOOD, of Danvers, in the county of Essex and State of Massachusetts, have invented certain new and useful Improvements in Electric Meters, of which the following is a specification.

My invention relates to electric meters for use on either alternating or continuous current circuits wherein the revolutions of an electric motor are registered to give an indication of the consumption of electricity; and it consists in the improvements hereinafter described and claimed.

One part of my invention relates to the placing of the commutator and the registering mechanism between the armature of the electric motor and its magnetic damping device, thereby, owing to the space taken up by them, separating said armature as far as possible from the damping-magnets in a meter of given outside dimensions.

My invention also relates to the introduction of an adjustable resistance into that part of the meter-circuit in which a current is desired to be obtained, which by its dynamic action on the armature gives an effort just sufficient to counterbalance the friction of the armature-bearings and gives a poise to said armature, so that the smallest current which it is desired the meter shall register will be able to operate accurately said meter by its feeble dynamic action.

My invention also relates to certain other features to be described more fully hereinafter.

In the drawings, Figure 1 is a perspective view of my invention complete. Fig. 2 is a diagram of the connections of the meter-circuits. Figs. 3 and 4 are respectively vertical sectional and plan views showing the construction of the commutator to which the armature-windings are connected. Fig. 5 is a perspective view of the brushes and adjustable brush-holder for use in connection with the commutator. Figs. 6 and 7 are respectively vertical sectional and plan views showing the construction and mode of operation of the damping-magnets and metallic ring.

In the drawings, $a$ designates the frame of a meter, which I have shown as capable of embodying my invention.

$b$ designates the armature of the electric motor whose speed is registered by the recording mechanism $c$. The armature $b$ revolves in the field produced by the dynamic action of the coils $d\ d'$, the ends of which coils are connected by means of the binding-posts $e$ and $e'$ to the external circuit. The armature $b$ is fastened to the shaft $f$, which revolves and rests on the jeweled bearing $g$, its upper end being journaled in the lower end of the bearing-stud $h$. The armature $b$ is connected electrically to the external circuit by means of the commutator $i$ and the brushes $j$ and $j'$, which are in turn connected, respectively, to the binding-posts $e'$ and $k$. To the shaft $f$ at its lower extremity are fastened the arms $l\ l'$, which carry the metallic ring $m$, designed to revolve between the magnet-poles $n$ of the magnet $o$ for the purpose of regulating the speed of the revolving structure in accordance with well-known principles. The coils $p$ and $p'$ also act on the armature $b$, one end of these coils being connected to the external circuit by means of the binding-post $e'$ and the other end being connected to the arm $q$, which bears on the carbon or other electrical resistance $r$, an end of which is connected to the external circuit by the binding-post $k$. The arm $q$ is capable of resting at different distances on the part $r$ from the end which is connected to the binding-post $k$, thereby making an adjustable resistance.

The revolutions of the armature $b$ are communicated to the recording mechanism $c$ by means of the worm-gear $s$.

Some of the above-mentioned parts will be most clearly seen and understood by referring to Figs. 3, 4, 5, 6, and 7.

Referring to Fig. 2, the manner of connecting the different coils may be seen. The source of electricity is represented by $t$, and $u$ represents the consuming device.

Fig. 3 shows the commutator as held on the shaft $f$ between the collar $c'$ and nut $b'$. The segments $v\ v'\ v''$ of the commutator are fastened to the cylindrical block $g'$, of insulating material, by means of screws, as $f'$.

In Fig. 5 the brushes $j$ and $j'$ are shown fastened to the insulated block $h'$, pivoted at $i'$, and the adjusting-screw $k'$ for changing the angle which the brushes and block make with the frame $m'$, the frame $m'$ being held to the frame $a$ (shown in Fig. 1) by the screws $o'$ $o''$, passing through slots in the frame $m$.

In Figs. 6 and 7 the permanent magnet, with the pole-pieces $n$, is shown, together with the bolt $q'$ and nuts $r'$ $r''$ for holding the pole-pieces to the magnet $o$. The whole is held to the meter-frame $a$ by the nut $r'''$. The pole-pieces $n$, in virtue of being fastened to the magnet-core $o'''$ by means of the rod $q'$ and nuts $r'$ $r''$, may be moved around the rod $q'$ as an axis, so that those on one side of the metallic ring $m$ shall be opposite or not opposite those on the other side, as shown by the broken lines in Fig. 7.

I have found it necessary to separate the field-coils as far as possible from the damping-magnet and pole-pieces, and in order to do this and still keep the instrument in a compact form I place the commutator and brushes and the recording mechanism, with its connecting-gear, to the shaft between the armature and the damping-magnet.

If the armature is placed near the damping-magnet, then the field projected from the same acts on said armature, giving a slight rotation, if continuous current is used, when no lamps or any other devices are consuming current passing through the meter. This would not be the case if the field projecting from the magnet was perfectly symmetrical to the armature—that is, of equal strength all around said armature with a neutral point at its center; but in practice this is not the case, and the result is to give an effect either in the same or opposite direction to the magnetic field desired to be given only by the effect of the current consumed by the lamps or other electrical device when used on direct current.

The location of the commutator or registering mechanism, as the case may be, performs the important function of separating the armature as far as possible from the magnet of the retarding device. It is important that the instrument should be compact, as meters are frequently installed in places where room is valuable and difficult to obtain. Furthermore, the compactness of construction cheapens the cost of manufacture, owing to a smaller amount of material used than there would be if the registering mechanism were placed on the other side of the armature as regards the damping-magnets. Again, as the armature must be removed from the magnet to such a distance as to make the effect due to the projected field from the magnet practically of no effect, then if the registering mechanism and commutator were placed on the other side of the armature from the magnet it would be necessary to increase the length of the shaft of the motor, hence greatly increasing its weight upon the jewel, owing to the fact that it would be necessary to make said shaft larger in diameter to possess the necessary strength in addition to the necessary elongation. Hence the location of the connection of the registering mechanism and the commutator performs the function of diminishing the weight of the revolving parts in the meter, having its armature separated the necessary distance from the magnet.

If instead of one magnet with two or more pole-pieces a number of magnets were used, placed around the movable part of the magnetic damping device, then the above mischievous effect would be likely to be greatly increased, owing to the probability of one of the magnets being stronger than the other, and hence throwing off a more unsymmetrical field toward the armature.

In Fig. 2 is shown the adjustable resistance produced by the combination of the arm $q$ and the resistance $r$ in series with the starting-coils $p$ $p'$, the purpose of which I mentioned in the first part of my specification. The resistance $r$ shown is of graphite composition, although a number of segments connected to each other by wire resistances and arranged in circular form, so as to come in contact with the arm $q$ in whatever position it could be placed, could be used for the same purpose. If this resistance were not adjustable and the current flowing in said starting-coil were constant and sufficient to counterbalance friction in still places, then if the meter were installed in places where the jar due to moving machinery or other causes is sufficient to alleviate the friction of the bearings it would revolve when no current designed to be measured were passing through it; or if this current is made constant and sufficient only to counterbalance friction in places where there is considerable vibration of foundation upon which meter is held said meter will have a tendency to revolve too slowly on its lightest loads when it is installed in places where the vibration is very slight.

Oftentimes it is necessary to change the tension of the brushes bearing on the commutator to prevent sparking, to make better contact, &c., thereby affecting the friction to a considerable extent. Therefore it is clear that accurate results can only be obtained, when the meter is operating on small loads under varying conditions which affect its friction, by making the starting-coil adjustable in its dynamic action.

I have found it to be of great advantage in relieving the weight of the revolving structure upon the jewel-bearing to have the brushes bear upon the commutator in a manner so that their pressure assists in sustaining this weight. Hence I have devised the brush arrangement shown in Fig. 5. By turning the adjusting-screw $k'$ any pressure within practical demand can be brought to bear upon the commutator by the ends of the brushes $j$ $j'$.

I regulate the speed at which the revolving structure should move with any given and determined amount of electricity passing through the meter by turning the pole-pieces $n$ of the magnet on one side of the metallic ring out of coincident position with respect to those on the other side of it, as shown by the broken lines in Fig. 7. This changes the air-gap and magnet-resistance between the poles, and consequently the strength of magnetism due to a permanent magnetic force can be regulated easily. This change in magnetism will also change the strength of the eddy-currents induced by it in the flat conducting metallic ring, and hence the dynamic action between the two will change also, and as a result the change of speed desired can be obtained.

To construct such a magnet, I preferably proceed as follows: Two pieces of steel of the approximate shape shown in Figs. 6 and 7 are mortised at their center and crossed at right angles, and placed and bolted, as shown and as before described, to each end of the magnet-core $o$. The structure is then magnetized, so that all the poles on each side of the ring are of the same polarity and that the lines of force all pass through the core $o$ in one direction. It is evident that the same result might be obtained by making the core $o$ of steel and the pole-pieces of iron, which might derive their magnetism by induction from the core $o$; but I have found by experiment that the magnetic and consequently the damping effect is not so great as when all the parts are of steel, which will retain the magnetism. The particular advantage of the shape of magnet shown is that the field projected from the same upon the armature is almost perfectly symmetrical, as it tends to keep itself of equal strength all around the center axis of the core $o$, which lies in the same direction as the armature-shaft.

Having thus explained the nature of the invention and described a way of constructing and using the same, though without attempting to set forth all of the forms in which it may be made or all of the modes of its use, it is declared that what is claimed is—

1. The combination, in an electric meter, of an electric motor, a magnetic damping device for regulating the speed of said motor, with a commutating device for the motor placed between its armature and the magnetic damping device.

2. In an electric meter, employing an electric motor which revolves a metallic mass through a constant magnetic field, a commutating device for the armature of said motor, and a registering mechanism for counting the revolutions of said motor, both placed between the armature of the motor and the said magnetic field.

3. The combination, in an electric meter, of an electric motor having its fixed coils in the main circuit and its movable coils in a shunt-circuit, and means for registering the revolutions of the motor, with additional fixed coils placed in a separately-derived circuit and in series with an artificial resistance which artificial resistance may be changed in amount, as and for the purposes described.

4. An electric meter having different circuits comprising in its construction an electric motor and its armature and an adjustable artificial resistance inserted into that part of the meter-circuits in which a current is to be obtained, which by its dynamic action on the armature of the electric motor may give sufficient energy to almost start and counterbalance the friction of said motor.

5. An electric meter having different circuits comprising in its construction an electric motor and its armature and an adjustable artificial resistance arranged in series with the coil of the motor which by its dynamic action on the armature of the electric motor may give sufficient energy to almost start and counterbalance the friction of said motor.

6. In an electric meter, an adjustable artificial resistance of graphite material placed in series with the fixed starting-coils of an electric meter, the whole being in a separately-derived circuit, in combination with a motor having its main fixed coils in the main circuit and its movable coils in a derived circuit, and a magnetic damping device for regulating the speed of said motor, and means for registering the revolutions of the same.

7. An artificial resistance placed in series with the starting fixed coils of an electric meter, the whole being in a separately-derived circuit, in combination with an electric motor having its main fixed coils in series with the consuming device, and its movable armature-coils in a derived circuit, and a magnetic damping device for said motor absorbing the dynamic energy of said coils, and means for registering the revolutions of said motor.

8. In an electric meter, a commutating device for the armature of the electric motor employed therein having the pressure of its stationary contacts upon the movable contact portion adjustable by means of a screw-and-block mechanism, as described, said pressure being in such a direction as to relieve the weight of the movable structure upon its bearing.

9. The combination, in an electric meter, of a commutating device for the armature of the electric motor employed therein, and having the pressure of the stationary contact portion of said commutating device upon its rotating contact portion adjustable by means of screw-and-block adjustment, with said electric motor and its damping device, and means for registering the revolutions of the same.

10. In an electric meter, the combination of an electric motor and means for registering its revolutions with a damping-magnet consisting of a steel core with its longitudinal axis lying in the same direction as the longitudinal axis of the shaft and pole-pieces for the magnet formed substantially as described, acting upon a flat metallic ring rigidly connected to said motor-armature.

11. A damping device for an electric motor, employed in an electric meter, consisting of a central steel core and pole-pieces arranged to carry the magnetism from one end of the core to the other, the path thereby made for the magnetic lines being approximately circular in shape, and having an air-gap between which a metallic ring rotates when propelled by the motive device of said meter, the central core having its axis perpendicular to the plane of the ring and passing through its center; substantially as described and shown.

12. Means for calibrating the speed of an electric meter consisting in a damping-magnet, the pole-pieces of one end of the magnet being adapted to be moved around the center of the magnet-core in such a manner as to bring the pole-pieces of one end into different positions as regards the pole-pieces of the other end, thereby changing the amount of air-gap in said magnet.

13. In an electric meter, having among its parts a motor the speed of which is registered to show the amount consumed, a commutator for the motor comprising in the construction of its movable parts, an insulating cylindrical block fastened to the shaft of the motor by means of a collar and nut, or their equivalents, as described, and segments fastened to the insulated block, in such a manner as to bear upon the brushes of the stationary part in the same direction as the shaft carrying the movable circuits of the motor bears upon its main support, substantially as and for the purpose described.

In testimony whereof I have signed my name to this specification, in the presence of two subscribing witnesses, this 23d day of January, A. D. 1895.

RALPH O. HOOD.

Witnesses:
ARTHUR W. CROSSLEY,
MARCUS B. MAY.